United States Patent Office 2,930,278
Patented Mar. 29, 1960

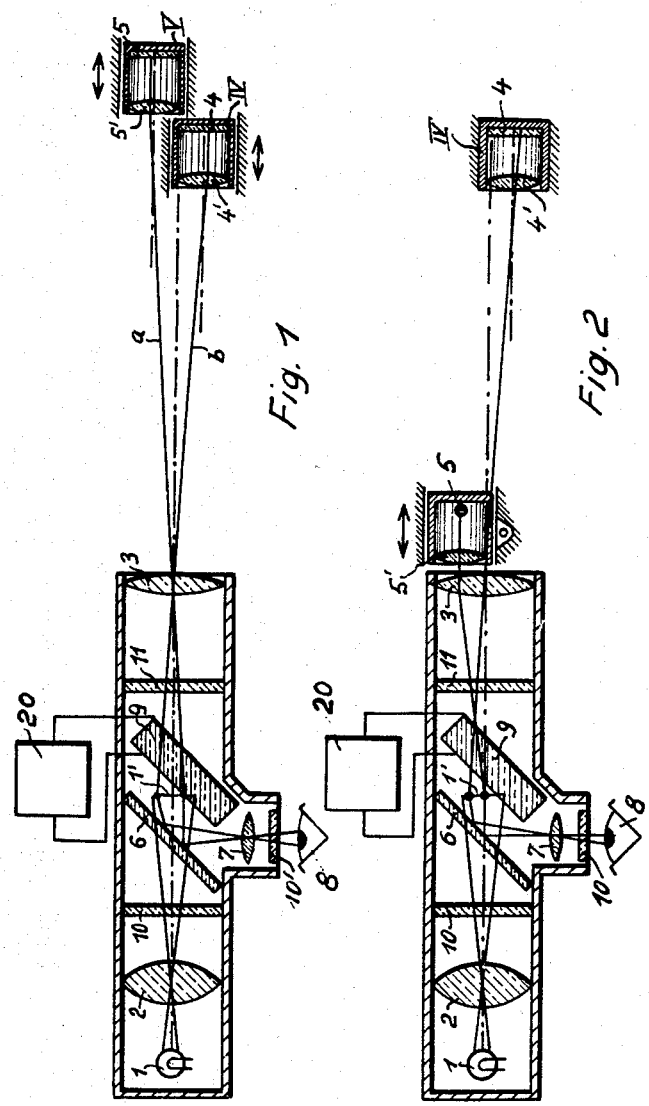

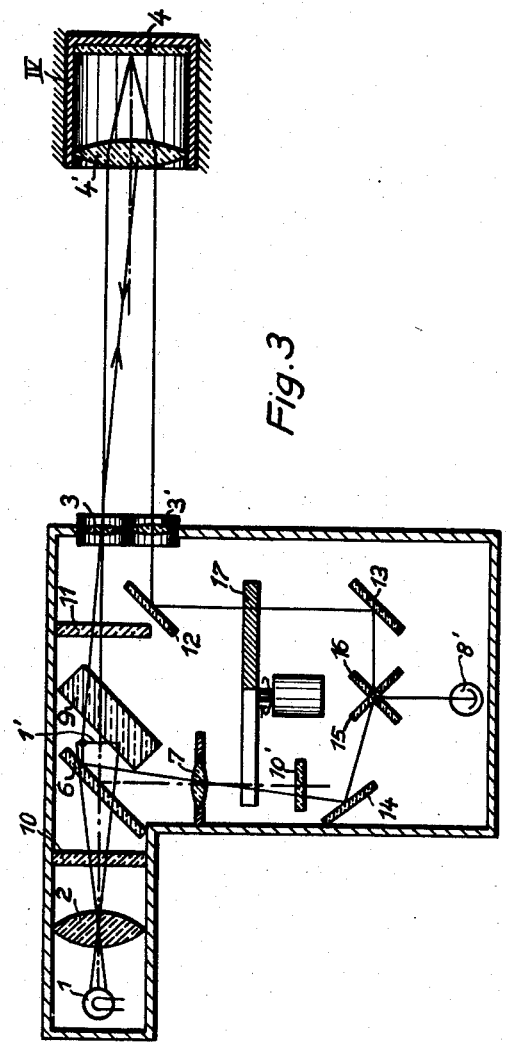

2,930,278

TELEMETER SYSTEM FOR MEASURING DISTANCES BY MEANS OF MODULATED LIGHT

Gerhard Hansen, Martin Drodofsky, and Hans Plesse, Heidenheim, Germany, assignors to Carl Zeiss, Oberkochen (Wurtt), Germany Application January 28, 1957, Serial No. 636,537

Claims priority, application Germany January 28, 1956

8 Claims. (Cl. 88—1)

This invention relates to a telemeter system and to a method for measuring distances by means of modulated light.

A general object of this invention is to provide an improved means for measuring distances to distant points with substantially improved accuracy.

A further object of this invention is to provide an improved method of measuring distances to distant points by means of modulated light, wherein the respective distances are determined in dependence of variations in intensity of light reflected from said distant point, said variations of light intensity being produced by phase shifting of the modulated oscillations.

Still another object of this invention is to provide improved optical means in the telemeter system to produce two images of the light source to be viewed by the observer.

It is also an object of this invention to provide an improved telemeter system including a photo-electric cell for receiving two images of the light source for an accurate determination of the respective distances to the distant point.

It was known in the art to use telemeter systems for determining the distances from distant points by means of modulated light, whereby the respective distances were determined in dependence of the variations in the light intensity of light reflected from said distant point, said light intensity variations being produced by phase shift of the modulated oscillations. The method according to Fizeau for determining the velocity of light was used hereby. This method comprises the projection of a light beam from a light source twice through a modulating means, the light beam passing through the modulating means the second time, after being reflected by a reflecting means provided at the distant point. The reflected light beam reaches the modulating means usually in a different oscillating condition, i.e. at a phase which is different from the phase of the light beam which was first projected to the distant point. This difference in phase will change the intensity of the light of the optically produced image of the light source or on an intermediate diaphragm, which is viewed by the observer. By displacement of the reflecting means in its optical axis it is possible to change the phase of the reflected light beam, so that at a phase-shift of $180° = \lambda/2$ a maximum light attenuation will be observed. But, as is known in the art a complete extinction of the light will not take place, so that the determination of the respective minimum of the light intensity depends substantially, in this case when the phase shift is $180° = \lambda/2$, from the ambient field conditions in the viewing field of the observer. In a manner similar to the observation conditions in visual photometers, when comparing two adjacent areas disposed along an imaginary border line at $1\frac{1}{2}°$ angular displacement, the relative limit of sensitivity of a normal eye will be approximately at 0, 02.

In case relatively large distances of several miles are to be determined, the diameter of the observed reflected light spot projected, for instance by an objective of a telemeter system from a reflecting means provided at said distant point, will be only in the order of a diffraction figure. Same will appear to the observer under an angular diameter of only few minutes of an arc. A further increase of the distance to be measured will not reduce the size of the light spot but will only reduce the apparent intensity of light of said light spot. It is obvious that the visual adjustment to such a minimum of intensity of light in case of such a small light spot is very inaccurate. Even in case photo-electric cells are used in the telemeter system the results obtained will be substantially inaccurate.

According to the present invention the sensitivity of the measurement is substantially increased in that two images of different light intensity are produced by the light reflecting means disposed at the distant spot. Said two images are projected into the viewing field of an observer, or onto a photo-electric cell. Thus the inaccurate adjustment to a minimum of light intensity is fully eliminated. The substantially more sensitive adjustment is effected by adjustment of the two images to the same intensity of light.

A further advantage of the inventive arrangement will be obtained, in accordance with the present invention, by provision of a second reflecting means at the distant point, which means is disposed in such a manner relative to the position of the first reflecting means, that these two reflecting means will produce over optical focusing means two light spots of the modulated light in the viewing field of the observer, the phase shift of the light spots being adjustable. The adjustment to an optimum of phase relation between the two light spots, corresponding to the same intensity of light of the two light spots, is effected by an axial displacement of the two optical reflecting means at the distant point, or by appropriate changes of the modulation frequency.

A further advantage of the present invention is the provision of the second reflecting means in the proximity of the observer. The reflecting means is preferably disposed in front of the objective lens in the direction of the distant spot. This objective lens projects the reflected light beam over the modulating means to the viewing device. This arrangement will substantially simplify the adjustment of the telemeter assembly. The desired positioning of the respective light spots relative to each other can be preferably effected by appropriate adjustment of the second reflecting means, or of the viewing device.

It could be determined that by visual comparison of two light spots the limit of sensitivity of the eye depends upon the distancing of the light spots from each other. A maximum sensitivity was observed when the light spots are distanced by approximately 15 degrees. A further advantage of this invention is that this preferable distancing is applied to the inventive telemeter assembly in that the distancing of the light spots in the viewing field is effected by positioning the second reflecting means sidewardly displaced relative to the first reflecting means at the distant spot. In case of the above described inventive arrangement when the second reflecting means is disposed in the proximity of the observer, appropriate adjusting means are provided to produce said relative displacement of the reflecting means.

Still a further advantage of this invention is that in case the two light spots having the same phase conditions but whereby one of the spots is brighter than the other light spot, it is possible to eliminate this difference of light intensities of the light spots by providing light dimming means in the path of the light beam producing the brighter light spot.

A further advantage is obtained in accordance with this invention when the two light spots are projected in form of real images of the light source onto two photo-electric cells which are connected in a differential circuit. It is furthermore possible to provide only one photo-electric cell and to apply said two real images alternatingly to the single photo-electric cell by disposing between the photo-electric cell and the optical viewing means a masking disc rotating or swinging at a low frequency.

According to a further advantageous feature of this invention, the second image is produced in the above described modification, in that the reflected light beam is split into two light beams in the objective lens, whereby one of these split light beams is projected directly, avoiding the modulating means, to the photo-electric cell. The intermediate images can be eliminated, and a real image is produced the intensity of light of which is independent from the distancing of the second reflected means. The respective adjusting means can be advantageously disposed in proximity of the observer.

Further objects and advantages of the invention will readily become apparent upon reading the following specification, taken in conjunction with the accompanying drawing, in which:

Fig. 1 shows a schematic representation of the telemeter system according to this invention wherein the second reflecting means at the distant point is disposed in close proximity of the first reflecting means at said distant point;

Fig. 2 shows a schematic representation similar to that of Fig. 1, but wherein the second reflecting means is disposed in close proximity of the observer, behind the objective lens in the parallel light beam; and, Fig. 3 shows a modification of the present invention in schematic representation wherein one part of the reflected light, avoiding the second passage of the modulating means, is used directly for producing a second real image.

Referring to the drawings, and more particularly to Fig. 1 thereof, the numeral 1 designates plate-shaped light source. The optical condenser 2 produces an image of this light source in a plane 1'. The light rays projected from this image 1' are directed by the objective lens 3 as parallel light beams $a$ and $b$ to the end of the measuring distance—to the distance point. At the distant point are provided in an axially adjustable housing IV a reflecting plane mirror 4 and a lens 4' the latter being spaced from said mirror a distance which is equal to its focal length. This arrangement, in known manner, will reflect the light beam impinging onto the mirror 4 in its own direction. A short distance behind the mirror 4 is disposed in another axially adjustable housing V a second mirror 5, which is sidewardly displaced relative to said first mirror 4. A corresponding lens 5' is spaced in front of the second mirror 5 at a distance equal to the focal distance of said lens. The reflected light beams from the mirrors 4 and 5 are united by the lens 3 in the image plane at 1' to form separate intermediate aerial images. These intermediate images are projected from the reflecting surface 6' of a partly transmitting reflecting means 6 over a viewing ocular lens 7 to the eye 8 of the observer. These intermediate images will be observed in the viewing field as light spots which are displaced relative to each other by approximately 15 degrees. A quartz plate 9 disposed in the path of the light beam between the partly transmitting reflecting means 6 and the objective lens 3 is used as a modulating means. An oscillating generator 20 provides in known manner the necessary oscillations for said quartz plate 9. In known manner, a polarizer means 10 is provided between the optical condenser 2 and the partly transmitting reflecting means 6, another polarizer means 11 is disposed between the modulator 9 and the objective lens 3, and still another polarizer means 10' is disposed between the lens 7 and the observer.

The function of the oscillating generator is as follows:

The light normally emitted from the light source is randomly polarized. When this light encounters the first polarizer 10, all light is rejected with the exception of that polarized at a distinct angle which is determined by the angular position of this polarizer. This plane-polarized light now passes through the quartz plate 9 and encounters the second polarizer 11 whose polarization is at right angle to that of the first polarizer 10, thus light cannot be transmitted. However, when a voltage is applied across the electrodes of the quartz plate 9 the quartz becomes doubly refracting. This, in effect, rotates the plane-polarized light from the first polarizer and permits light to pass through the second polarizer in accordance with the applied voltage on the quartz plate 9.

When the light beam is reflected from the mirrors 4 and 5 it encounters first the polarizer 11, then the quartz plate 9 and the polarizer 10'. The polarizer 11 only permits light to pass through which is polarized at a distinct angle. This plane-polarized light is rotated again by the quartz plate 9 and in this manner light can pass through the polarizer 10' whose polarization is at right angle to that of polarizer 11. As the reflected light encounters the quartz plate 9 normally at a moment when it is in another modulation phase than at the moment when the light is first modulated its intensity is changed. The desired optimum distance of the two light spots observed by the observer's eye is obtained by a suitable selection of the distance of the two reflecting arrangements 4, 4' and 5, 5' in a direction vertical to their optical axes. As shown all of the parts 1, 2, 3, 6, 7, 9, 10, 10' and 11 are arranged in a tubular housing II provided between its end with a lateral viewing tube in which the ocular lens 7 and the polarizer 10' are mounted. In Fig. 2 the same numerals are applied to similar parts. The first reflecting arrangement IV, 4, 4' is disposed fixedly in the distant spot, but the second reflecting arrangement V, 5, 5' is, according to the modification of this invention, displaceably disposed directly behind the objective lens 3, between said lens and the distant point. In this case the reflector 5 is a convex mirror having a very small curvature radius, so as to produce a sufficiently small light spot in the viewing field, despite the close proximity to the objective lens 3. The reflecting arrangement V, 5, 5' is disposed in proximity of the observer, so that the optimum distance between the respective light spots in the viewing field can be obtained by adjustment of the housing V or of the objective lens 3 and the ocular lens 7.

The operation of the telemeter system as illustrated in the Figs. 1 and 2 is as follows:

First of all for the purpose of calibration the length of a known distance is measured. This distance for instance corresponds to one half of the modulation wave length. During this calibration the reflector arrangement V is moved relatively to the reflector arrangement IV in axial direction until the two images observed by the eye 8 of the observer have the same brightness.

When now the unknown distance is to be measured with the system illustrated in Fig. 1, the reflector arrangement IV, which is arranged at the distant point, is slidably adjusted together with the reflector arrangement V without changing the axial distance between the two reflector arrangements IV and V until the eye 8 again will observe that the two images have the same brightness. When this balanced condition is obtained, one knows that between the calibration position and the subsequently adjusted position of the reflector arrangements IV and V is a distance which corresponds to a multiple of the modulation wave length and, therefore, one is able to determine the length of the previously unknown distance.

When employing the telemeter system as shown in Fig. 2, however, only the reflector arrangement IV at the distant point is adjusted in axial direction until the two images observed by the viewer have the same brightness. In this balanced condition one knows that the distance between the calibration position and the subsequently found adjusted position of the reflector arrangement IV corresponds to a multiple of the modulation wave length.

In Fig. 3 the same numerals again indicate the same members of the telemeter assembly. An additional auxiliary lens 3' is provided in this modification which separates a portion of the light from the light beam reflected by the reflecting arrangement IV, 4, 4' at the distant point. In other words, the reflected light emerging from the reflecting arrangement IV, 4, 4' at the distant point will be split, as mentioned above, by said first objective lens 3 and said auxiliary lens 3', one portion of the light beam being directly reflected by the plane-mirrors 12, 13 and 16 and forms a real image to the photo-electric cell 8'. It should be noted that this portion of the beam does not pass through the modulating device 9. The other portion of the split reflected light beam is projected in a manner similar to the arrangement of Figs. 1 and 2, through the polarizer of 11, and modulating device 9 onto the reflecting surface 6' of the partly transmitting reflecting device 6. This image of the light source is reflected by said surface 6' over the ocular lens 7, polarizing means 10' and mirrors 14 and 15 also as a real image to the photo-electric cell 8'. The mirrors 15 and 16 are displaced relative to each other in vertical direction. Both images from the mirror systems 14, 15 and 13, 16 are projected onto the cathode of the photoelectric cell 8'. After the optical arrangement is adjusted, the masking disc 17 is rotated, so that the respective images are projected alternatingly onto the photo-electric cell, so that a photo-current is induced in the photo-electric cell, which has an alternating current component and can be amplified.

The operation of the telemeter system illustrated in Fig. 3 is as follows:

The light beam which enters the auxiliary lens 3' does not pass through the modulator. This means that the intensity curve of this light beam corresponds to the intensity curve of the light beam which was emitted by the device, of course with a phase displacement caused by the passage of the light. Therefore, in order to establish a balanced position, the light beam passing through the lens 3 should have the same intensity curve or, in other words, the reflected light beam should reach the modulator always at the same modulating phase as the emitted light beam. During the measurement the reflector arrangement IV is slidably adjusted in axial direction until this balanced position is reached. The same result is obtained by a corresponding displacement of the transmitter and the receiver or by changing the modulation frequency. When the balanced position is reached, namely then, when the photoelectric cell 8' produces a direct current, then the distance between the balanced position of the reflector arrangement IV and the photo-electric cell 8' will be a whole multiple of the modulation wave length. The required axial displacement of the reflector arrangement IV from the distant point to be measured may again be calculated by a simple mechanical measurement.

Different light modulating devices can be used instead of the shown quartz plate, for instance a Kerr-cell device or similar.

Although there were shown only some of the modifications of the present invention, it is to be clearly understood that the same was merely for the purpose of illustration, and that changes and modifications may readily be made therein by those skilled in the art, without departing from the spirit and scope of the present invention.

What we claim as our invention is:

1. An arrangement for measuring distances by means of modulated light, including in a tubular housing, a light source, an optical condenser for said light source, a partly transmitting reflecting means in the path of the light beam passing through said optical condenser, an objective lens axially spaced from said partly transmitting reflecting means arranged at one end of said housing to direct a beam of parallel light rays towards a point the distance of which from the point where the observer is stationed is to be measured, and light modulating means disposed in the path of the light beam between said partly transmitting reflecting means and said objective lens; means for reflecting said beam of parallel light rays in its direction of incidence back into said housing and for splitting said beam into two beams; and additional means inside said tubular housing for viewing the two separate images formed by said two light beams, and means for adjusting said two images to the same light intensity.

2. An arrangement for measuring distances by means of modulated light, including in a tubular housing, a light source, an optical condenser for said light source, a partly transmitting reflecting means in the path of the light beam passing through said optical condenser, an objective lens axially spaced from said partly transmitting reflecting means arranged at one end of said housing to direct a beam of parallel light rays towards a point the distance of which from the point where the observer is stationed is to be measured, and light modulating means disposed in the path of the light beam between said partly transmitting reflecting means and said objective lens; means for reflecting said beam of parallel light rays in its direction of incidence back into said housing and for splitting said reflected beam into two beams, said last mentioned means comprising two light reflecting means having optical axes arranged in spaced and parallel relation and within the beam of parallel light rays emitted by said objective lens, each one of said two light reflecting means consisting of a mirror and a lens spaced from said mirror, said two light reflecting means being arranged at said distant point and are adapted to effect said splitting of said reflected light beam; and additional means inside said tubular housing for viewing the two separate images formed by said two light beams, and means for adjusting said two images to the same light intensity.

3. An arrangement for measuring distances by means of modulated light, including in a tubular housing, a light source, an optical condenser for said light source, a partly transmitting reflecting means in the path of the light beam passing through said optical condenser, an objective lens axially spaced from said partly transmitting reflecting means arranged at one end of said housing to direct a beam of parallel light rays towards a point the distance of which from the point where the observer is stationed is to be measured, and light modulating means disposed in the path of the light beam between said partly transmitting reflecting means and said objective lens; means for reflecting said beam of parallel light rays in its direction of incidence back into said housing and for splitting said reflected beam into two beams; said last mentioned means comprising two light reflecting means having optical axes arranged in spaced and parallel relation and within the beam of parallel light rays emitted by said objective lens, each one of said two light reflecting means consisting of a mirror and a lens spaced from said mirror, said two light reflecting means being arranged at said distant point and are adapted to effect said splitting of said reflected light beam; one of said two light reflecting means being arranged at a smaller distance away from said objective lens than the other one of said two light reflecting means; and additional means inside said tubular housing for viewing the two separate images formed by said two light beams, and means for adjusting said two images to the same light intensity.

4. An arrangement for measuring distance by means of modulated light, including in a tubular housing, a light source, an optical condenser for said light source, a partly transmitting reflecting means in the path of the light beam passing through said optical condenser, an objective lens axially spaced from said partly transmitting reflecting means arranged at one end of said housing to direct a beam of parallel light rays towards a point the distance of which from the point where the observer is stationed is to be measured, and light modulating means disposed in the path of the light beam between said partly transmitting reflecting means and said objective lens; means for reflecting said beam of parallel light rays in its direction of incidence back into said housing and for splitting said reflected beam into two beams, said last mentioned means comprising two light reflecting means having optical axes arranged in spaced and parallel relation and within the beam of parallel light rays emitted by said objective lens, each one of said two light reflecting means consisting of a mirror and a lens spaced from said mirror, said two light reflecting means being adapted to effect said splitting of said reflected light beam; one of said two light reflecting means being arranged directly adjacent said objective lens and the other one of said two light reflecting means being arranged at said distant point; and additional means inside said tubular housing for viewing the two separate images formed by said two light beams, and means for adjusting said two images to the same light intensity.

5. An arrangement for measuring distances by means of modulated light, including in a tubular housing, a light source, an optical condenser for said light source, a partly transmitting reflecting means in the path of the light beam passing through said optical condenser, an objective lens axially spaced from said partly transmitting reflecting means arranged at one end of said housing to direct a beam of parallel light rays towards a remote point the distance of which from the point where the observer is stationed is to be measured, and light modulating means disposed in the path of the light beam between said partly transmitting reflecting means and said objective lens; means for reflecting said beam of parallel light rays in its direction of incidence back into said housing and for splitting said reflected beam into two beams, said last mentioned means comprising a light reflecting means consisting of a mirror and a lens arranged at said remote distant point for receiving light rays from said objective lens so as to reflect a portion of said light rays back into said objective lens so that the latter produces an image of the light source, in said partly transmitting reflecting means, a photoelectric cell in said housing energized by the light of said image, a second objective lens arranged with its optical axis parallel to the optical axis of said first mentioned objective lens and in the same end of the housing as the latter, said second objective lens receiving another portion of the light rays reflected by said reflecting means at said remote distant point means for reflecting the light rays passing through said second objective lens so as to avoid said light modulating means as well as said partly transmitting reflecting means and being directly projected to said photoelectric cell and a rotary masking means arranged in the path of the two light beams projected onto said photoelectric cell for causing said two light beams to alternately energize said photoelectric cell.

6. A telemeter system for measuring distances to a distant point by means of modulated light, including a light source, optical condenser means for said light source, partly transmitting reflecting means in the path of the light beam passing through said condenser means, a first objective lens axially spaced from said partly transmitting reflecting means, and adapted to effect the paralleling of said light beam, light modulating means disposed in the path of the light beam between said partly transmitting reflecting means and said first objective lens, a polarizer means disposed between said modulating means and said condenser means and another polarized means between said modulating means and said first objective lens, a light reflecting means comprising a mirror and a lens provided at said distant point by acting together with said first objective lens adapted to produce an image of the light source in said partly transmitting reflecting means, a photo-electric cell energized by the light of said image; a second objective lens for separating from said parallel light beam reflected by said reflecting means at said distant point a separate light beam, one of said split reflected beams passing through said modulating means and being projected from said partly transmitting reflecting means upon the photoelectric cell by a first optical means projecting a real image of the light source upon said photo-electric cell, the other of said split reflected light beams avoiding said modulating means being directly projected from said reflecting means at said distant point by said second objective lens and by a second optical means to said photo-electric cell projecting thereon a second real image of the light source, wherein said first optical means includes light deflecting means and a condenser lens means projecting the light to said photo-electric cell, said second optical means including light deflecting means for projecting the light beam directly from said second objective lens to said photo-electric cell and a rotary masking means arranged in the path of the two light beams projected onto said photoelectric cell for causing said two light beams to alternately energize said photoelectric cell.

7. A telemeter system for measuring distances to a distant point by means of modulated light, including a light source, optical condenser means for said light source, partly transmitting reflecting means in the path of the light beam passing through said condenser means, a first objective lens axially spaced from said partly transmitting reflecting means, and being adapted to effect the paralleling of said light beam, light modulating means disposed in the path of the light beam between said partly transmitting reflecting means and said first objective lens, a polarizer means disposed between said modulating means and said condenser means and another polarized means between said modulating means and said first objective lens, a light reflecting means comprising a mirror and a lens provided at said distant point by acting together with said first objective lens adapted to produce an image of the light source in said partly transmitting reflecting means, a photoelectric cell energized by the light of said image and a second objective lens for separating from said parallel light beam reflected by said reflecting means at said distant point a separate light beam, one of said split reflected beams passing through said modulating means and being projected from said partly transmitting reflecting means upon the photoelectric cell by a first optical means projecting a real image of the light source upon said photoelectric cell, the other of said split reflected light beams avoiding said modulating means being directly projected from said reflecting means at said distant point by said second objective lens and by a second optical means to said photoelectric cell projecting thereon a second real image of the light source, wherein said first optical means includes a plurality of light deflecting means and condenser lens means projecting the light to said photoelectric cell, said second optical means including a plurality of light deflecting means for projecting the light beam directly from said second objective lens to said photoelectric cell, the first real image being projected approximately into the same plane as the second real image and a rotary masking means arranged in the path of the two light beams projected onto said photoelectric cell for causing said two light beams to alternately energize said photoelectric cell.

8. A telemeter system for measuring distances to a distant point by means of modulated light, including a light source, optical condenser means for said light source, partly transmitting reflecting means in the path of the light beam passing through said condenser means, a first objective lens axially spaced from said partly transmitting reflecting means, and being adapted to effect the paralleling of said light beam, light modulating means disposed in the path of the light beam between said partly transmitting reflecting means and said first objective lens, a polarizer means disposed between said modulating means and said condenser means and another polarized means between said modulating means and said first objective lens, a light reflecting means comprising a mirror and a lens provided at said distant point by acting together with said first objective adapted to produce an image of the light source in said partly transmitting reflecting means, a photoelectric cell energized by the light of said image; a second objective lens for separating from said parallel light beam reflected by said reflecting means at said distant point a separate light beam, one of said split reflected beams passing through said modulating means and being projected from said partly transmitting reflecting means upon the photoelectric cell by a first optical means projecting a real image of the light source upon said photoelectric cell, the other of said split reflected light beams avoiding said modulating means being directly projected from said reflecting means at said distant point by said second objective lens and by a second optical means to said photoelectric cell projecting thereon a second real image of the light source, wherein said first optical means includes a plurality of light deflecting means and condenser lens means projecting the light to said photo-electric cell, said second optical means including a plurality of light deflecting means for projecting the light beam directly from said second objective lens to said photoelectric cell, the first real image being projected approximately into the same plane as the second real image, and a rotary masking disk for causing said two images received from said first and second optical means to alternately energize said photoelectric cell.

References Cited in the file of this patent

FOREIGN PATENTS

| | | |
|---|---|---|
| 971,202 | France | July 5, 1950 |
| 732,360 | Great Britain | June 22, 1955 |

OTHER REFERENCES

"Surveying With the Velocity of Light," Milton E. Compton, Jr. Surveying and Mapping, July-September 1954, vol. XIV, No. 3, pages 284, 285 relied on.